United States Patent [19]
Brochot et al.

[11] Patent Number: 5,948,538
[45] Date of Patent: Sep. 7, 1999

[54] GLAZING ASSEMBLY COMPRISING A SUBSTRATE PROVIDED WITH A STACK OF THIN LAYERS FOR SOLAR PROTECTION AND/OR THERMAL INSULATION

[75] Inventors: Jean-Pierre Brochot, Paris; Fabrice Didier, Meudon La Foret, both of France

[73] Assignee: Saint-Gobain Village, Courbevoie, France

[21] Appl. No.: 08/975,491

[22] Filed: Nov. 21, 1997

[30] Foreign Application Priority Data

Nov. 21, 1996 [FR] France ................................. 96-14194

[51] Int. Cl.⁶ ..................................................... B32B 17/00
[52] U.S. Cl. .......................... 428/432; 428/434; 428/450; 428/469; 428/472; 428/698; 428/701; 428/702; 359/359; 359/360; 359/585; 359/589
[58] Field of Search ..................................... 428/432, 434, 428/469, 472, 450, 698, 701, 702; 359/359, 360, 585, 589

[56] References Cited

U.S. PATENT DOCUMENTS

| | | | |
|---|---|---|---|
| 4,179,181 | 12/1979 | Chang | 359/360 |
| 4,965,121 | 10/1990 | Young | 428/213 |
| 5,059,458 | 10/1991 | Goodall | 428/34 |
| 5,071,206 | 12/1991 | Hood | 359/360 |
| 5,085,926 | 2/1992 | Iida | 428/216 |
| 5,153,054 | 10/1992 | Depauw | 428/216 |
| 5,506,037 | 4/1996 | Termath | 428/216 |
| 5,595,825 | 1/1997 | Guiselin | 428/428 |
| 5,677,065 | 10/1997 | Chaussade | 428/432 |

FOREIGN PATENT DOCUMENTS

| | | |
|---|---|---|
| 0 611 213 B1 | 8/1994 | European Pat. Off. . |
| 0 616 883 A1 | 9/1994 | European Pat. Off. . |
| 0 638 528 A1 | 2/1995 | European Pat. Off. . |
| 0 644 164 A1 | 3/1995 | European Pat. Off. . |
| 0 678 484 A2 | 10/1995 | European Pat. Off. . |
| 0 722 913 A1 | 7/1996 | European Pat. Off. . |
| 2733495 | 10/1996 | France . |
| WO 96/000394 | 1/1996 | WIPO . |
| WO 96/00194 | 1/1996 | WIPO . |

*Primary Examiner*—Timothy M. Speer
*Attorney, Agent, or Firm*—Pennie & Edmonds LLP

[57] ABSTRACT

The subject of the invention is a glazing assembly comprising at lest one transparent substrate provided with a stack of thin "A" layers composed in succession of a first coating of dielectric material, a first "functional" layer having reflection properties in the infrared, in particular a metallic layer, and a third coating of dielectric material. The sum of the thicknesses of the first and second functional layers is greater than or equal to 25 nm. The ratio of the thickness of the first functional layer to the thickness of the second functional layer is less than 0.55.

26 Claims, 1 Drawing Sheet

GLAZING ASSEMBLY COMPRISING A SUBSTRATE PROVIDED WITH A STACK OF THIN LAYERS FOR SOLAR PROTECTION AND/OR THERMAL INSULATION

BACKGROUND OF THE INVENTION

The invention relates to transparent substrates, in particular those made of an inorganic rigid material such as glass or of an organic material of the rigid, semi-rigid or flexible polymer type, of the polycarbonate, polymethyl methacrylate PMMA and polyethylene terephthalate PET type, the said substrates being coated with a stack of thin layers comprising at least one layer exhibiting metal-type behaviour which can act on solar radiation and/or on long-wavelength infrared radiation.

The invention relates more particularly to the use of such substrates for manufacturing thermally insulating and/or anti-UV windows. These windows are intended to equip both buildings and vehicles, for the purpose, in particular, of decreasing the air-conditioning load and/or of reducing excessive over-heating caused by the ever increasing extent of glazed surfaces in the passenger compartments.

A known type of multilayer stack for giving the substrates such properties consists of at least one metallic layer, such as a silver layer, which is arranged between two layers of dielectric material. This stack is generally obtained by a succession of depositions carried out using a vacuum technique, such as sputtering, optionally assisted by a magnetic field.

Patent EP-0,638,528 thus discloses a glazing assembly, more particularly a multiple glazing assembly of the double-glazing type intended for buildings, in which at least one of the glass substrates which compose it includes a stack of thin layers consisting of two silver layers inserted between three coatings of dielectric material. According to this document, the first silver layer, that is to say that which is closest to the substrate carrying the stack, is chosen to be thinner than the second, in particular so that its thickness corresponds to approximately 65% of the thickness of the second silver layer. This "dissymmetry" in the thickness of the two functional layers of the stack has proved to be advantageous in that it makes it possible to obtain glazing assemblies having a satisfactory selectivity, if the selectivity S is defined as the ratio of the light transmission $T_L$ to the solar factor SF (which is itself defined by the ratio between the total energy entering the room through the glazing in question and the incident solar energy). Furthermore, this dissymmetry makes it possible to obtain glazing assemblies whose visual appearance in reflection is attractive, in particular by having an agreeable colour, in the blues or the blue-greens, but very neutral, very "white-washed".

However, the type of multilayer stack recommended in this document is capable of further improvement, very particularly with regard to its thermal performance characteristics. Thus, the glazing assemblies described have at best a value of the solar factor SF of 38%, while in the future it is intended to manufacture glazing assemblies whose solar factor can be lowered to values which are less than or equal to 32% and even less than or equal to 30%.

SUMMARY OF THE INVENTION

The object of the invention is therefore to develop a novel type of thin multilayer stack having two radiation-reflecting layers which reflect solar radiation and/or infrared radiation, which stack can be used to obtain glazing assemblies whose solar factor is greatly reduced, without this gain in terms of thermal properties being to the detriment of its optical properties, in particular by still having sufficient selectivity and/or a satisfactory calorimetric response, most particularly in external reflection.

The subject of the invention is a glazing assembly which comprises at least one transparent substrate provided with a stack of thin layers, called "A" layers, and which is composed in succession of:

a first coating of dielectric material, a first so-called "functional" layer having reflection properties in solar radiation and/or the infrared, in particular a metallic layer;

a second coating of dielectric material;

a second so-called "functional" layer having reflection properties in solar radiation and/or the infrared, in particular a metallic layer, and of the same kind as the first functional layer, a third coating of dielectric material.

According to the invention, the thicknesses of the two functional layers have been selected so as to fulfil two conditions:

on the one hand, the sum of their geometric thicknesses is greater than or equal to 25 nm and, on the other hand, the ratio of the thickness of the first functional layer (the layer closest to the substrate carrying the stack) to the thickness of the second functional layer is less than or equal to 0.55, in particular less than or equal to 0.52.

The combination of these two conditions allows the glazing assembly, of which the substrate thus coated forms part, to have a solar factor SF of less than or equal to 32%, but also to have a very neutral and very pleasing colour, in external reflection, which corresponds, in the (L, a*, b*) colorimetry system, to negative a* and b* values of less than 4, and preferably of less than 3, in absolute values. (This spectrophoto-metric data refers only to glazing having clear substrates. As will be explained later, these values should change if at least one of the substrates is tinted).

DETAILED DESCRIPTION OF THE INVENTION

Figure 1:
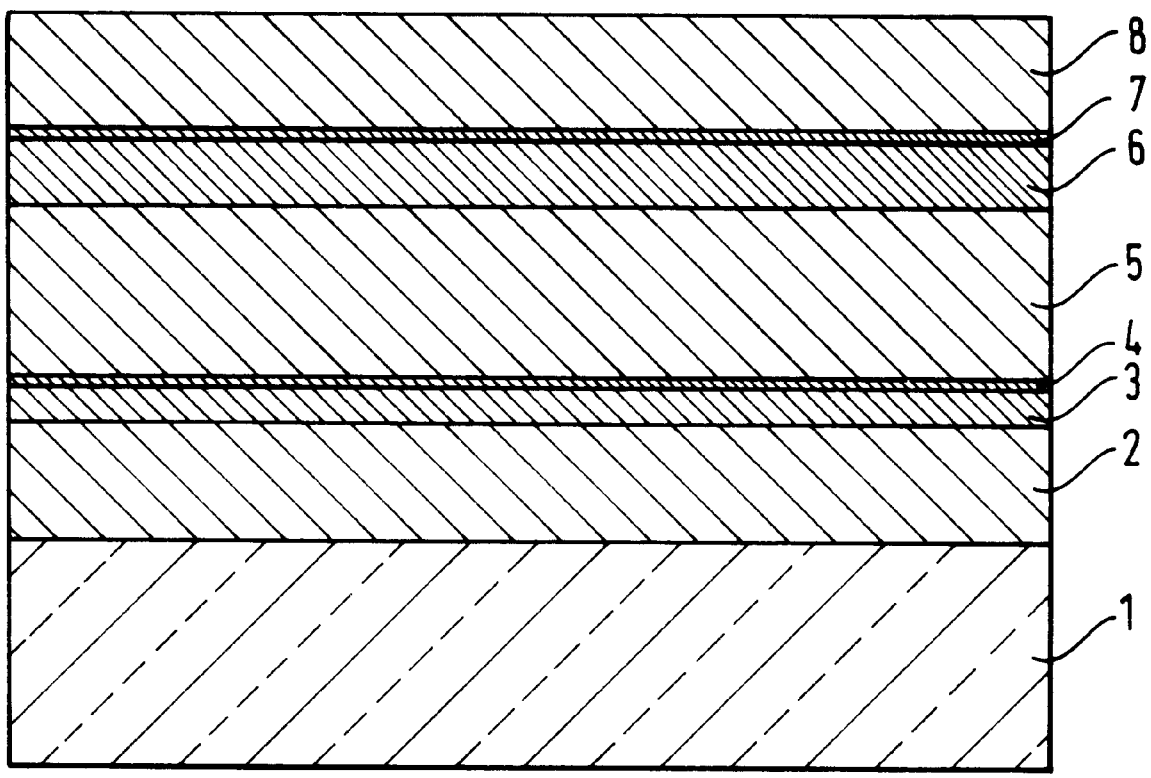
FIG. 1 is a cross-sectional view of the glazing assembly of the invention.

By imposing a greater minimum total thickness of the functional layers and by very greatly exaggerating the "dissymmetry" between the thicknesses of these two layers compared with the teaching of European Patent EP-0,638,528, the invention has therefore made it possible to establish a new, and highly advantageous, compromise between thermal performance and optical performance. Hitherto, it was inconceivable to achieve values of solar factor of this order except to the detriment of the appearance in external reflection and/or of the selectivity of the glazing assembly. This is because although the reduction in the value of the solar factor is quite closely related to the increase in the total thickness of the reflective layers, this increase was known to alter the optical appearance of the glazing, in particular giving it too strong a colour and/or of an undesirable tint in reflection, and/or by decreasing its degree of transparency too markedly. The solution found by the invention, using functional layers of extremely different thicknesses, has very surprisingly resolved this "impasse", making it possible for the glazing to maintain a neutral and pleasing colour in reflection and/or a selectivity $T_L/SF$ of about 2, while spectacularly reducing the value of SF. All this comes about as if the choice of functional layers having thicknesses which are markedly different made it possible to reduce, or even eliminate, the optically detrimental consequences of a total thickness of reflective layers of at least 25 nm.

Secondarily, the coated glazing assemblies according to the invention furthermore have the advantage that the "neutral" appearance in reflection, previously quantified by the a* and b* values, remains virtually unchanged, whatever the angle of incidence at which the glazing is observed. This means that an outside observer, looking at a facade of a building entirely equipped with such glazing, does not have the visual impression of a change in tint depending on where on the facade he rests his gaze. This appearance homogeneity characteristic is of great interest, since this is currently highly sought after by architects in the building industry.

By the same token, a secondary advantage is that it has been found that the glazing assemblies according to the invention were quite "stable" in terms of colorimetry in external reflection, in that slight variations in the thickness of one of the layers of the stack do not result in glaring appearance defects from one glazing assembly to another or on the surface of any one glazing assembly. This is a very important point from the industrial standpoint, where very large and/or mass-produced glazing assemblies are manufactured with the objective of maintaining appearance and performance characteristics which are as uniform as possible from one series of glazing assemblies to another, and above all from one area to another within the same glazing assembly.

Advantageously, the ratio of the thickness of the first functional layer to the thickness of the second functional layer is chosen to be less than or equal to 0.51, preferably less than or equal to 0.50 and is in particular between 0.40 and 0.50, preferably between 0.45 and 0.48. Also preferably, the sum of the thicknesses of these two functional layers is between 25 and 35 nm, in particular between 27 and 33 nm.

Advantageously, at least one of the two functional layers, in particular both of them, are made of silver or based on silver, optionally in the form of an alloy with a minor content of another metal.

In order to fulfil the conditions with regard to the thickness differences between the two functional layers, it is possible, in particular, to select the thickness of the first layer within the range of between 8 and 13 nm and the thickness of the second layer within the range of between 15 and 22 nm.

Moreover, the visual appearance of the glazing assembly, both in reflection and in transmission, may also be refined and controlled by suitably selecting the materials and the thicknesses relating to the three coatings of dielectric material.

Thus, according to a non-limiting variant of the invention, the optical thickness of the first coating may be chosen to be greater than that of the third coating. The optical thickness of the first coating may thus correspond to at least 110% of the optical thickness of the third layer, especially at least from 120 to 150% and preferably from 130 to 140% of the optical thickness of the latter.

In this specific case in particular, it is also recommended to select the optical thickness of the second coating of dielectric material so that it is greater than the sum of the optical thicknesses of the other two coatings. The thickness of the second-coating of dielectric material may thus correspond to at least 115%, in particular from 120 to 130%, of the said sum.

It is also preferable for the sum of the optical thicknesses of these three coatings to be between 280 and 340 nm, and in particular to be approximately 300 nm.

In terms of the choice of material for this stack of thin layers, it is recommended to cover at least one of the functional layers, in particular both of them, with a thin "barrier" layer, especially when the dielectric coatings which cover them are deposited by reactive sputtering in the presence of oxygen. These barrier layers thus protect the functional layers, which are metallic, from contact with oxygen, the barrier layers themselves being at least partially oxidized during deposition of the upper dielectric coating. They preferably have a thickness of between 0.5 and 4 nm, and in particular are selected from at least one of the following metals: Ti, Ta, Nb, Ni, Cr, Zn, Sn or an alloy of the stainless-steel type or an Ni-Cr alloy.

At least one of the three coatings of dielectric material, and preferably all three, comprise at least one layer based on a metal oxide or a mixture of metal oxides, preferably selected from bismuth oxide $Bi_2O_3$, tin oxide $SnO_2$, zinc oxide ZnO, tantalum oxide $Ta_2O_5$, niobium oxide $Nb_2O_5$, tungsten oxide $WO_3$ and titanium oxide $TiO_2$. This may also be a silicon-based compound of the silicon oxide $SiO_2$, silicon oxynitride $SiO_xN_y$ or silicon oxycarbide $SiO_xC_y$ type. Also able to be used are nitride-based materials of the silicon nitride $Si_3N_4$ or aluminium nitride AlN type or a "mixed" nitride of the $Si_xAl_yN_z$ type. In general, all the materials, in particular all the oxides of the type mentioned above, are preferably chosen so as to have a refractive index of about from 1.50 to 2.5, in particular of about from 1.8 to 2.3.

In fact, each dielectric coating may be composed of a single layer or of several superimposed layers, the properties of which may advantageously be complementary.

As a first non-limiting variant with regard to the choice of dielectric materials, either or both of the first and second coatings may advantageously comprise, just under one or the other of the functional layers, a layer based on zinc oxide, a material known to promote the "wetting", or the spreading-out into a sheet, of the silver-type layers. In particular, either of these two coatings may have a superposition of layers of the ($Nb_2O_5$ or $Ta_2O_5$ or $WO_3$ or $SnO_2$ or $Bi_2O_3$)/ZnO type, as has already been envisaged, for example, in European Patent EP-0,678,484.

Other materials known to promote the "wetting" of the silver-based layers are, for example, tantalum oxide or niobium oxide, which may form part of sequences of the $SnO_2/Ta_2O_5$ or $SnO_2/Nb_2O_5$ type, as disclosed in European Patent EP-0,611,213.

In another non-limiting variant with regard to the choice of dielectric materials, it is advantageous for the third coating to comprise a layer based on AlN, $Si_3N_4$ or $Si_xAl_yN_z$, it being possible for this type of material to be able, should the substrate undergo a heat treatment after the stack has been deposited, to protect the functional layers from oxidation by the ambient atmosphere, these materials constituting effective oxygen barriers. It may also be emphasized that nitrides of the $Si_3N_4$ type, which have quite a high hardness, may be able to improve the mechanical durability of the multilayer stack in its entirety.

The substrate on which the stack of thin layers is deposited may be of inorganic origin, and may most particularly be made of glass. It may also be of organic origin, in particular based on a rigid or semi-rigid polymer of the polycarbonate PC or polymethyl methacrylate PMMA type. The stack may also be deposited on semi-rigid or flexible substrates of the polyethylene terephthalate PET type, which substrates are then combined with a rigid substrate by lamination.

The substrate may be chosen to be clear, of the clear silica-soda-lime glass type. It may also be chosen to be bulk-tinted. (Although it may be chosen to be clear, it may, however, be combined with a bulk-tinted glass substrate once it has been assembled into a glazing assembly of the multiple-glazing or laminated-glazing type). The bulk-tinted glass not (or not yet) provided with the stack of thin layers, may advantageously have, using the $D_{65}$ illuminant, for a thickness of 4 mm, a light transmission $T_L$ of between 65% and 90%, an energy transmission $T_E$ of between 40% and 80%, a dominant colour wavelength in transmission of between 470 nm and 525 nm and a colour purity in transmission of between 0.4% and 4%. In the (L, a*, b*) colorimetry system, this colorimetric appearance in transmission is defined by a* values of between −9 and 0 and b* values of between −4 and +2. The substrate may in particular be a glass of the type sold by Saint-Gobain Vitrage under the name "Parsol", in particular those tinted green or grey. It may also be a green glass sold by Saint-Gobain under the name "TSA" or "TSA$^{2+}$", the composition of which is for instance described in European Patents EP-0,616,883, EP-0,644,164 and EP-0,722,427 and in WO-96/00394.

In particular, the tinted glass is chosen depending on the final $T_L$ or on the calorimetric response in reflection which it is desired to obtain for the glazing in its entirety.

It goes without saying that, in cases where the substrate is chosen to be coloured, the calorimetric response, in particular in reflection, of the glazing assembly is modified compared to that of glazing assemblies having a clear substrate. Thus, if the substrate is a green-tinted glass (such as the glasses of the TSA type mentioned above), the a* and b* values in reflection may, compared to the values indicated above, be modified, in particular remaining negative but then exceeding to a greater or lesser extent the figure of 3 in absolute values (the same remark applies if the stack is deposited on a clear substrate, but if the said substrate is combined, in the glazing assembly, with another substrate which is itself coloured). Likewise, the light transmission of the glazing assembly, if it incorporates at least one bulk-tinted substrate, will be modified, it being lower than that which the same glazing assembly would have with the same multilayer stack but not using any bulk-tinted substrate.

The glazing assembly which comprises the coated substrate according to the invention may advantageously have the structure of a multiple-glazing unit, in particular of a double-glazing unit. The multiple-glazing unit may be composed of several coated substrates according to the invention. Generally, the multilayer stack in the double-glazing unit is arranged as the 2 and/or 3 faces. The faces of a multiple-glazing unit are conventionally, in a known manner, numbered starting from that face which is furthest to the outside with respect to the room (or to the passenger compartment) once the glazing has been fitted into the building (or the vehicle). Such a double-glazing unit may then have, using the $D_{65}$ illuminant, a light transmission $T_L$ of about from 50 to 65% and a solar factor SF of about from 25% to 32%, and therefore a selectivity of about 2.

The glazing assembly which comprises the coated substrate according to the invention may also form part of a laminated glazing assembly.

The details and advantageous characteristics of the invention will emerge from the following non-limiting examples which are illustrated by means of FIG. 1.

It may now be pointed out that, in all these examples, the successive layers of the stack are deposited by sputtering assisted by a magnetic field, however any other deposition technique may be envisaged provided that the thicknesses of the layers to be deposited are fully under control.

The substrates on which the stacks are deposited are silica-soda-lime glass substrates 6 millimetres in thickness. They are combined into a double-glazing unit with another substrate identical to the first one but without any layers, with a gas-filled cavity 12 millimetres in thickness between them. The gas chosen is in this case argon. (It may be replaced by air, krypton or any other rare gas or mixture of at least two of these gases).

FIG. 1 shows the stack according to the invention, but does not respect the proportions with regard to the thicknesses of the layers so that it is easier to be discerned. It shows the substrate 1, defined previously, covered with a first tin oxide layer 2, a first silver layer 3, an Nb barrier layer 4 (which is partially oxidized), a second tin oxide layer 5, a second silver layer 6, another barrier layer 7 identical to the previous one, and lastly a final layer 8, once again of tin oxide.

The deposition equipment comprises at least one sputtering chamber provided with cathodes equipped with targets made of suitable materials under which the substrate 1 passes in succession. These deposition conditions for each of the layers are as follows:

the silver-based layers 3, 6 are deposited using a silver target, at a pressure of 0.8 Pa in an argon atmosphere;

the $SnO_2$-based layers 2, 5, 8 are deposited by reactive sputtering using a tin target, at a pressure of 0.8 Pa and in an argon/oxygen atmosphere containing 36% by volume of oxygen;

the Nb-based layers 4, 7 are deposited using a niobium target, again at the same pressure and in an argon atmosphere.

The power densities and the run speeds of the substrate 1 are adjusted in a known manner in order to obtain the desired thicknesses of the layers.

COMPARATIVE EXAMPLES 1 TO 4

Examples 1 to 4 below are comparative examples, in the sense that, in the four stacks, they use:

either silver layers 3, 6 having an insufficient total thickness (Example 1);

or silver layers 3, 6 whose thicknesses are not sufficiently different from each other (Examples 2, 3 and 4).

Table 1 below gives, for each of the four examples, the nature and thicknesses (in nanometers) of the layers of the stack in question. The barrier layers 4, 7 are labelled Nb, knowing that they are in fact at least partially oxidized once all the layers have been deposited. This table also indicates, without any units, the ratio of the thickness of the first silver layer 3 to the second silver layer 6, i.e. Ag(3)/Ag(6) and the total thickness of the two layers 3 and 6 in nm, i.e. Ag(3)+Ag(6):

TABLE 1

|        |     | EX. 1 | EX. 2 | EX. 3 | EX. 4 |
|--------|-----|-------|-------|-------|-------|
| Glass  | (1) | —     | —     | —     | —     |
| $SnO_2$ | (2) | 41    | 40    | 39    | 39    |
| Ag     | (3) | 8     | 11    | 11.5  | 10    |
| Nb     | (4) | 1     | 1     | 1     | 1     |
| $SnO_2$ | (5) | 74    | 78    | 82    | 82    |
| Ag     | (6) | 12    | 14    | 16.5  | 18    |
| Nb     | (7) | 1     | 1     | 1     | 1     |
| $SnO_2$ | (8) | 33    | 30    | 28.5  | 28.5  |

TABLE 1-continued

|  | EX. 1 | EX. 2 | EX. 3 | EX. 4 |
|---|---|---|---|---|
| Ag(3)/Ag(6) | 0.66 | 0.78 | 0.70 | 0.56 |
| Ag(3) + Ag(6) | 20 | 25 | 28 | 28 |

Table 2 below indicates, for each of these examples:

the light transmission $T_L$ in % ($D_{65}$ illuminant);

the solar factor SF (according to Standard DIN 67507, Annex A233) in %;

the dominant wavelength in transmission $\lambda(T)$ and the colour purity in transmission p(T);

the external light reflection $R_L$ in % ($D_{65}$ illuminant);

the colour purity in reflection p(R);

the a* and b* values in the (L, a*, b*) colorimetry system in reflection.

TABLE 2

|  | EX. 1 | EX. 2 | EX. 3 | EX. 4 |
|---|---|---|---|---|
| $T_L$ | 66 | 62 | 62.1 | 60.6 |
| SF | 38 | 32 | 30 | 30 |
| $\lambda$ (T) | 486 | 505 | 533 | 494 |
| p (T) | 1 | 2.2 | 5.5 | 3.1 |
| $R_L$ | 9.5 | 11.8 | 12 | 14.2 |
| p (R) | 1 | 8 | 10 | 5.4 |
| a* | −0.8 | −5 | −11 | −5 |
| b* | −0.5 | −5 | −8 | −4 |

EXAMPLES 5 AND 6 ACCORDING TO THE INVENTION

The examples comply with the characteristics with regard to the two silver layers recommended by the invention.

Table 3 below gives, for both these examples, the same information as in Table 1 above:

TABLE 3

|  |  | EX. 5 | EX. 6 |
|---|---|---|---|
| Glass | (1) | — | – |
| $SnO_2$ | (2) | 39 | 39 |
| Ag | (3) | 9.5 | 9 |
| Nb | (4) | 1 | 1 |
| $SnO_2$ | (5) | 82 | 82 |
| Ag | (6) | 18.5 | 19 |
| Nb | (7) | 1 | 1 |
| $SnO_2$ | (8) | 28.5 | 28.5 |
| Ag(3)/Ag(6) |  | 0.51 | 0.47 |
| Ag(3) + Ag(6) |  | 28 | 28 |

Table 4 below gives, for both these examples, the same information as in Table 2 above:

TABLE 4

|  | EX. 5 | EX. 6 |
|---|---|---|
| $T_L$ | 60.1 | 60 |
| SF | 30 | 30 |
| $\lambda$ (T) | 489 | 477 |
| p (T) | 2.7 | 2.1 |
| $R_L$ | 15 | 15.3 |
| p (R) | 3.8 | 2.7 |

TABLE 4-continued

|  | EX. 5 | EX. 6 |
|---|---|---|
| a* | −3 | −2 |
| b* | −2 | −1 |

All the colorimetry measurements given in Tables 2 and 4 were carried out at normal incidence.

Other measurements of a* and b* in reflection were carried out on Example 5 according to the invention at non-normal incidence, in particular at an angle of incidence of 45° and of 65° with respect to the normal to the plane of the double-glazing unit. Table 5 below gives these various values as a function of the angle of incidence $\theta$ in degrees:

TABLE 5

|  | EX. 5 | |
|---|---|---|
|  | $\theta = 45°$ | $\theta = 65°$ |
| a* | −2.5 | −3 |
| b* | −1.5 | −0.8 |

The following conclusions may be drawn from all this data: Comparative Example 1, which in fact conforms to the teaching of the aforementioned Patent EP-0,638,528 provides a useful calorimetric response, in particular in reflection, and a $T_L$/SF selectivity of about 2, which is good. However, its solar factor is too high compared with the objective set by the invention.

Comparative Examples 2 to 4 show that it is not simply a question, in order to lower the SF, of increasing the total silver thickness since, in this case, the optical reflection properties which are also the objective of the invention, i.e. a pale colour, if possible in the blue-greens, are lost; whatever the Ag(3)/Ag(6) ratio, it is clear that if it remains greater than 0.56 the a* and b* values in reflection remain too high in absolute values, leading to too strong a colour—a loud turquoise—which is, within the context of the invention, aesthetically undesirable.

Thus, only Examples 5 and 6 manage to reconcile low SF values and low a* and b* values in reflection, at the price of a very pronounced dissymmetry between the thicknesses of the two silver layers, the selectivity being also maintained at about 2.

It should also be pointed out that it is advantageous to select as far as possible the thicknesses of the layers of dielectric material, in this case $SnO_2$, which make it possible to "manipulate" the calorimetric response of the glazing assembly in order to obtain, according to the aesthetic requirements, tints which are more in the blue or more in the green, for example.

It should be noted that it is advantageous for the sum of the optical thicknesses of the three dielectric coatings, here made of $SnO_2$ having an index of approximately 1.9 to 2, to remain close to 300 nm so as to prevent the colour in reflection from being able to approach a yellow tint. Likewise, it is advantageous for the intermediate coating to be significantly thicker, always considering the optical thickness, than the sum of the other two coatings, in particular approximately 20% thicker: if the intermediate coating is significantly thinner, there is the risk of the colour in reflection tending towards the red, but if it is significantly higher the colour in reflection remains within the blues, however the value of the SF tends to increase.

It should also be stressed that it is advantageous for the thickness of the third dielectric coating to be relatively "thin", in any case greater than that of the first coating since it has turned out that such a choice leads to the glazing being less calorimetrically "sensitive" in the sense that its appearance in reflection remains unaltered, or almost unaltered, even if, on an industrial scale one or other of the thicknesses of the layers of the stack might fluctuate by 1 or 2 nm, depending on the manufacturing tolerances. This is obviously a major industrial advantage since it is thus possible greatly to reduce the scrap rate of glazing assemblies which optically do not comply with the specifications.

Moreover it has been found that varying the thickness of the third dielectric coating made it possible to adjust the intensity of the colour in reflection, too great a thickness tending to give rise to an increase, in absolute value, in the b* value in reflection, an increase which most often results in a stronger blue colour in reflection.

In the light of the results given in the above tables, it may be argued that the $R_L$ values of the stacks are slightly "high" in the sense that they are of the order of 15% in a double-glazing unit. In fact, this level of reflection has proved not to be troublesome from the aesthetic standpoint since, above all, the selection of a "neutral" tint, which the invention gives, is currently favoured. This has even proved to be very advantageous for at least two reasons:

- this is because, by having a $R_L$ slightly higher than that encountered in the stacks where the total silver thickness is less, it was noticed that it was very much easier to achieve the calorimetric "stability" of the glazing assembly, which comes back to the above comment with regard to the "insensitivity" with respect to possible fluctuations in the thicknesses of the layers, but also to achieve stability even at a non-normal angle of incidence: from Table 5, it may be seen that at grazing incidence a* and b* values corresponding to tints in the blues or greens are maintained without "swinging" towards aesthetically unattractive tints, such as red for example;
- the level of $R_L$ provided by the stacks according to the invention has also proved to be very advantageous as regards the harmony between the "window glazing" panels provided with the stacks (these panels obviously being transparent) and the facade cladding panels, more commonly called "curtain walling" which is associated with them. This curtain walling generally consists of glazing similar to the window glazing, and is even provided with exactly the same thin multilayer stacks, but is opacified using an absorbent varnish. It is then important for the colorimetric differences between "window glazing" and "curtain walling" to be as small as possible so that, seen from the outside, the building whose facade consists only of these two types of glazing has a harmonious appearance, with the same tint everywhere. Now, in fact, the window glazing according to the invention, with $R_L$ values of about 14–16%, have proved to be much "simpler" to "colour match" with its curtain walling than window glazing having lower $R_L$ values.

Moreover, the results from Table 5 demonstrate that the glazing assemblies according to the invention retain a very homogeneous calorimetric appearance in reflection, even up to angles of incidence which are regarded as unfavourable: at 45 or 65°, a* and b* remain negative, being at most 3 in absolute value, to within at most ±1 with respect to the values measured at normal incidence.

We claim:

1. Glazing assembly comprising at least one transparent substrate (1) provided with a stack of thin "A" layers consisting essentially of, in succession:
   a) a first coating (2) of dielectric material;
   b) a first 'functional' metallic layer (3) having reflection properties in the infrared region;
   c) a second coating (5) of dielectric material;
   d) a second 'functional' metallic layer (6) having reflection properties in the infrared region; and
   e) a third coating (8) of dielectric material; wherein
   f) the sum of the thicknesses of the first and second functional layers (3, 6) is greater than or equal to 25 nm and;
   g) the ratio of the thickness of the first functional layer (3) to the thickness of the second functional layer (6) is less than 0.55, so that the glazing assembly has a solar factor SF of less than or equal to 32% and a colorimetry in external reflection corresponding to negative a* and b* values of less than 4, in absolute values.

2. Glazing assembly according to claim 1, wherein:
   a) the ratio of the thickness of the first functional layer (3) to the thickness of the second functional layer (6) is less than or equal to 0.50.

3. A glazing assembly according to claim 2, wherein the thickness of the second functional layer (6) is between about 0.40 and 0.50.

4. A glazing assembly according to claim 2, wherein the thickness of the second functional layer (6) is between about 0.45 and 0.48.

5. Glazing assembly according to claim 1, wherein:
   a) the sum of the thicknesses of the two functional layers (3, 6) is between 25 and 35 nm.

6. A glazing assembly according to claim 5, wherein the sum of the thicknesses of the two functional layers (3, 6) is between 27 and 33 nm.

7. Glazing assembly according to claim 1, wherein:
   a) at least one of the functional layers (3, 6) is made of silver or a silver alloy.

8. Glazing assembly according to claim 1, wherein:
   a) the first functional layer (3) has a thickness of between 8 and 13 nm; and
   b) the second functional layer (6) has a thickness of between 15 and 22 nm.

9. Glazing assembly according to claim 1, wherein:
   a) the first coating (2) of dielectric material has an optical thickness which is greater than the optical thickness of the third coating (8) of the dielectric material, the optical thickness of the first coating (2) corresponding to at least 110% of the optical thickness of the third coating (8).

10. A glazing assembly according to claim 9, wherein the optical thickness of the first coating (2) corresponds to about 120 to 150% of the optical thickness of the third coating (8).

11. A glazing assembly according to claim 9, wherein the optical thickness of the first coating (2) corresponds to about 130 to 140% of the optical thickness of the third coating (8).

12. Glazing assembly according to claim 1, wherein:
   a) the second coating (5) of dielectric material has an optical thickness which is greater than or equal to 115% of the sum of the optical thicknesses of the other two layers (2, 8) of dielectric material.

13. A glazing assembly according to claim 12, wherein, the second coating (5) of dielectric material has an optical thickness which is greater than or equal to about 120 to 130% of the sum of the optical thicknesses of the other two layers (2, 8) of dielectric material.

14. A glazing assembly according to claim 12, wherein the sum of the optical thicknesses of the three coatings (2, 5, 8) of dielectric material is about 300 nm.

15. Glazing assembly according to claim 1, wherein:
   a) the sum of the optical thicknesses of the three coatings (2, 5, 8) of dielectric material is between 280 and 340 nm.

16. Glazing assembly according to claim 1, wherein:
   a) at least one of the two functional layers (3, 6) is covered by an at least partially oxidized thin metallic barrier layer (4, 7) which has a thickness of from 0.5 to 4 nm and is selected from the group consisting of Ti, Ta, Nb, Ni, Zn, Sn, stainless-steel alloys and Ni-Cr alloys.

17. Glazing assembly according to claim 1, wherein:
   a) at least one of the three coating (2, 5, 8) of dielectric material comprises at least one layer of a metal oxide selected from the group consisting of $Bi_2O_3$, $SnO_2$, ZnO, $Ta_2O_5$, $Nb_2O_5$, $WO_3$, and $TiO_2$, a silicon oxide selected from the group consisting of $SiO_2$, $SiO_xC_y$, and $SiO_xN_y$, a nitride selected from the group consisting of $Si_3N_4$, AlN, $Si_xAl_yN_z$, and mixtures thereof.

18. Glazing assembly according to claim 1, wherein:
   a) the third coating (8) of dielectric material comprises a layer selected from the group consisting of $Si_3N_4$, AlN, $Si_xAl_yN_z$, and mixtures thereof.

19. Glazing assembly according to claim 1, wherein:
   a) at least the first of the first and second coating (2, 5) of dielectric material comprises, under at least one of the other of the two functional layers (3, 6), a layer of zinc oxide.

20. Glazing assembly according to claim 1, wherein:
   a) the assembly has a $T_L/F_S$ ratio at least equal to 2.

21. Glazing assembly according to claim 1, wherein:
   a) the assembly has a color in external reflection defined by a* and b* values which do not change whatever the viewing angle of incidence.

22. Glazing assembly according to claim 1, wherein:
   a) the assembly has a double-glazing structure with a stack of A layers as at least one of the 2 and 3 faces.

23. Glazing assembly according to claim 22, wherein:
   a) the assembly has a light transmission of between 50 and 65% and a solar factor of between 25% and 32%.

24. Glazing assembly according to claim 1, wherein:
   a) the assembly comprises a bulk-tinted glass substrate.

25. A glazing assembly according to claim 1, wherein the ratio of the thickness of the first functional layer (3) to the thickness of the second functional layer (6) is less than or equal to 0.52 so that the glazing assembly has a solar factor SF of less than or equal to 32% and a colorimetry in external reflection corresponding to negative a* and b* values of less than 3, in absolute value.

26. A glazing assembly according to claim 1, wherein:
   (a) at least the first of the first and second coating (2, 5) of dielectric material comprises, under at least one of the other of the two functional layers (3, 6), a layer comprised of a superposition of layers of ZnO and a member selected from the group consisting of $Nb_2O_5$, $Ta_2O_5$, $WO_3$, $SnO_2$ and $Bi_2O_3$.

* * * * *

UNITED STATES PATENT AND TRADEMARK OFFICE
CERTIFICATE OF CORRECTION

PATENT NO. : 5,948,538

DATED : September 7, 1999

INVENTORS : Jean-Pierre Brochot et al.

It is certified that error appears in the above-identified patent and that said Letters Patent is hereby corrected as shown below:

On the title page at [73] Assignee: change "Saint-Gobain Village" to --Saint-Gobain Vitrage--.

Signed and Sealed this

Twenty-fifth Day of April, 2000

Attest:

Q. TODD DICKINSON

Attesting Officer

Director of Patents and Trademarks